United States Patent [19]

van der Eerden

[11] Patent Number: 4,639,973

[45] Date of Patent: Feb. 3, 1987

[54] DEVICE FOR CUTTING OFF THE TAIL OF SLAUGHTERED POULTRY

[75] Inventor: H. F. J. M. van der Eerden, Boxtel, Netherlands

[73] Assignee: Stork PMT B.V., Boxmeer, Netherlands

[21] Appl. No.: 720,672

[22] Filed: Apr. 8, 1985

[30] Foreign Application Priority Data

Apr. 9, 1984 [NL] Netherlands .......................... 8401122

[51] Int. Cl.$^4$ ............................................. A22C 21/00
[52] U.S. Cl. ............................................. 17/11; 17/12; 83/440; 83/449
[58] Field of Search ...................... 17/11, 11 B, 12, 52, 17/61, 63; 83/440, 448, 449

[56] References Cited

U.S. PATENT DOCUMENTS

| 2,926,383 | 3/1960 | Steck | 17/11 |
| 3,277,518 | 10/1966 | Hooley | 17/52 |
| 4,245,372 | 1/1981 | Messner | 17/11 |

FOREIGN PATENT DOCUMENTS 0109708 11/1982 European Pat. Off. ................ 17/11

Primary Examiner—Willie G. Abercrombie
Attorney, Agent, or Firm—Newton, Hopkins & Ormsby

[57] ABSTRACT

Device for cutting of the tail of slaughtered poultry which is moved forward, hanging by the legs on a conveyor track, comprising a cutting knife fixedly mounted under the conveyor track, having a V-shaped cutting edge and being supported by a guide for the bird's body.

4 Claims, 3 Drawing Figures

DEVICE FOR CUTTING OFF THE TAIL OF SLAUGHTERED POULTRY

BACKGROUND OF THE INVENTION

The invention relates to a device for cutting off the tail of slaughtered poultry which is moved forward, hanging by the legs on a conveyor track.

DESCRIPTION OF THE PRIOR ART

The procedure of dividing up slaughtered poultry by means of a number of operating devices arranged in line along a conveyor track is a technique which has become increasingly important over the last few years. During these operations for example the wings of the bird are removed and the carcass is then separated into a front part containing the breast portion and a back part containing the legs.

It may be desired during these operations to remove the tail from the back part. The invention aims at providing a device by means of which this operation can be carried out mechanically.

SUMMARY OF THE INVENTION

To this end the device according to the invention is characterized by a cutting knife fixedly mounted under the conveyor track, having a V-shaped cutting edge and being supported by a guide for the bird's body.

By means of a device of simple construction which can readily be included in an existing installation the tail of the bird is removed in a reliable manner.

A preferred embodiment comprises, viewed in the direction of movement, a noncutting positioning inlet part in front of each of the cutting edge rims. This measure has the advantage that the, noncutting, inlet parts position the bird portion at the place where the cut has to be made, ie. the transition between tail and body, relative to the cutting edge rims so that the cut is always made at the correct position.

In an embodiment according to the invention intended for processing bird portions such as a back part with legs, a rounded pressure member is positioned under the cutting knife, being spring-pressed towards the cutting knife and having guides on either side thereof running in the transport direction of the poultry. This pressure member is preferably designed with a positioning groove running in the peripheral direction. It is preferably attached to one end of a U-shaped leaf spring which is fixedly supported by its other end.

The guides are preferably formed by support plates while a height-adjustable fixed stop is preferably provided underneath the pressure member.

Moreover, the two legs of the V-shaped cutting edge preferably include, in a direction transversely to the direction of movement of the poultry, an obtuse angle with the tip directed upwards. This provides for adaptation to the shape of the bird upstream of and at the position of the tail.

DESCRIPTION OF A PREFERRED EMBODIMENT

Figure 1:
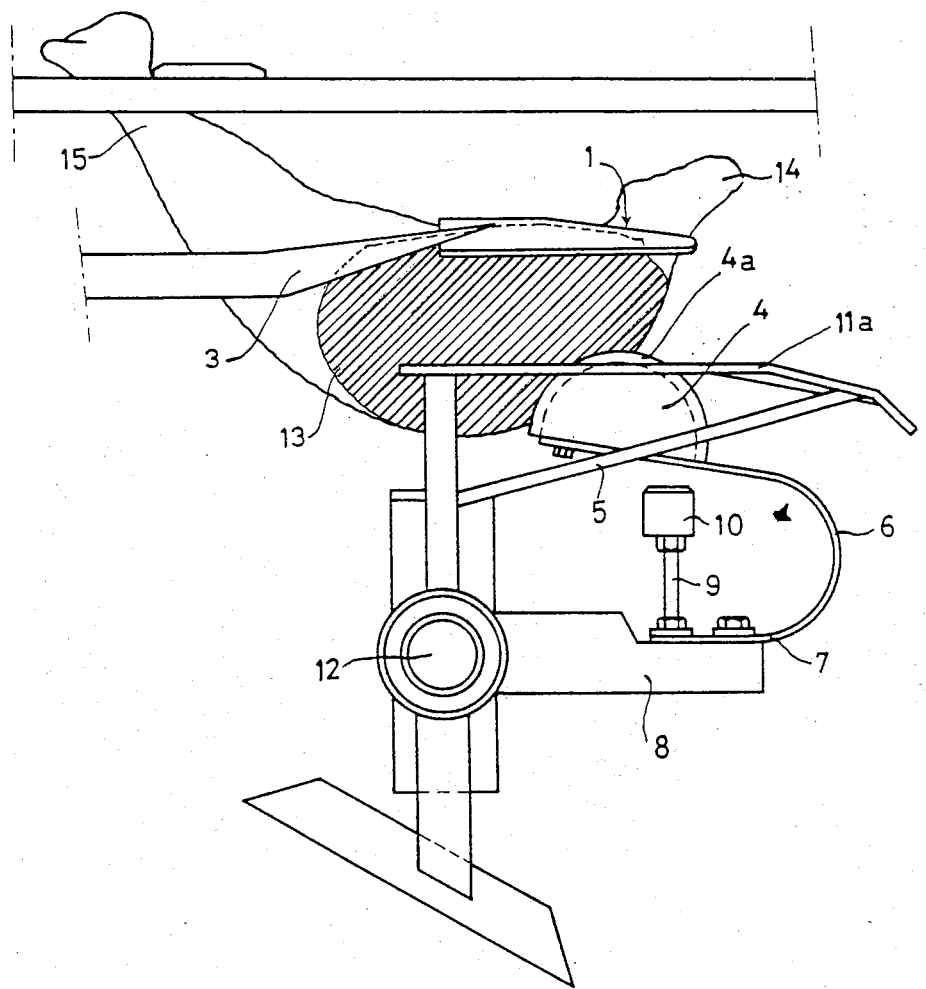
FIG. 1 is a diagrammatic side view of the device according to the invention showing the poultry carcass in partial cross-section.
Figure 2:
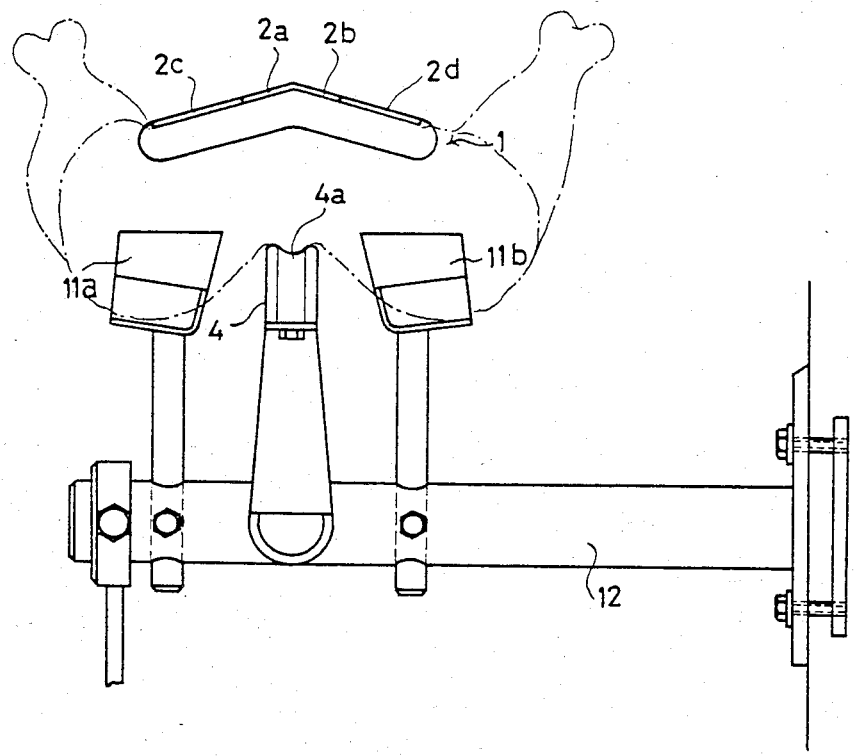
FIG. 2 is a diagrammatic front view of this embodiment showing the poultry carcass in phantom.
Figure 3:
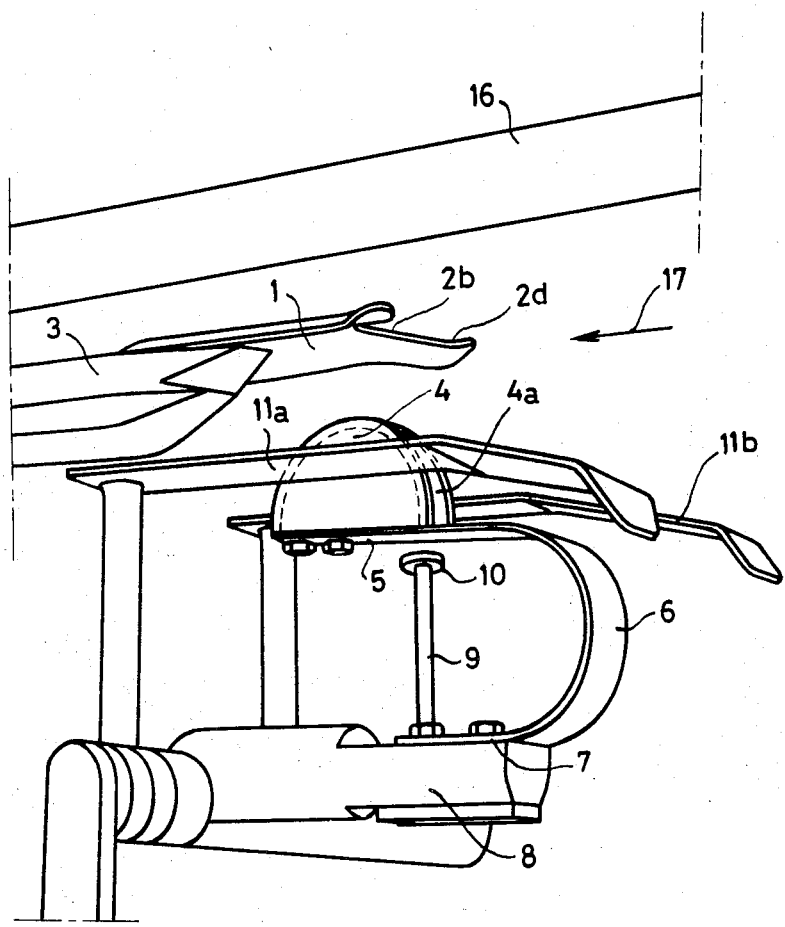
FIG. 3 is a perspective view of the embodiment according to FIGS. 1 and 2.

The embodiment of the device according to the invention as shown in the figures, comprises a cutting knife 1 having a V-shaped cutting edge 2 and which is attached to the end of a tapering guide 3. The cutting edge 2 consists of the two cutting edge parts 2a, 2b, which are each preceded by a noncutting positioning edge 2c and 2d respectively. The parts 2a, 2c on the one hand and 2b, 2d on the other hand include an obtuse angle. Below the cutting knife 1 is arranged a rounded pressure member 4 having a groove 4a running in the peripheral direction and which is attached to the end 5 of a U-shaped leaf spring 6, the other end 7 of which is fixedly fastened to a fixed support 8. This support also carries a rod 9 which is provided on the end with screw thread, and of which the other end carries a stop 10 which is located a short distance underneath the pressure member 4. This distance is adjustable. Plate-shaped supports 11a, 11b are attached to either side of the pressure member 4 and above the end 5 of the leaf spring 6. The entire arrangement is supported by the support rod 12.

The device operates as follows:

The carcass 13 of the poultry, the tail 14 of which has to be cut off, is supplied, hanging by the legs 15 on a suitable conveyor track 16 and moving in the direction of arrow 17. The FIG. 1 shows a carcass 13 in partial cross-section of which the breast portion and the wings have already been removed in a preceding stage so that the breastside of the carcass is open. The poultry arrives with each leg 15 passing on either side of tapering guide 3 and cutting knife 1 and the carcass passing between the knife 1 and the supports 11a, 11b, while the inlet parts 2c, 2d position the place at which the cut has to be carried out relative to the cutting edges 2a, 2b and the bird is centered during its movement by the pressure member 4, in that the backbone (not shown) fits into a groove 4a. The tail 14 is cut from the carcass by the cutting edges 2a, 2b.

What is claimed is:

1. A device for severing the tail of slaughtered poultry while a carcass is suspended by its legs from a conveyor track and being transported breast side forward along the track comprising:
   a cutting knife situated to pass between the two suspended legs of the carcass as it moves forward on the conveyor track;
   an upper guide means attached to the cutting knife for maintaining the back bone side of the carcass in approximate alignment with the cutting knife;
   a lower guide means having two elongate spaced apart plates wherein one plate is situated under each side of the carcass; and
   a spring-mounted pressure member located between the two plates for biasing the carcass upwardly to bring the tail to be cut in alignment with the cutting knife.

2. The device according to claim 1, wherein the cutting knife has a V-shaped edge having outwardly diverging non-cutting positioning ends and a correspondingly V-shaped cutting edge situated in the apex of the V-shaped edge.

3. The device according to claim 1, wherein the pressure member further comprises a peripherally located positioning groove.

4. The device according to claim 1, further comprising a height-adjustable fixed stop located below the pressure member.

* * * * *